May 18, 1937. J. N. CAROTHERS Re. 20,368

PROCESS FOR PRODUCING DIARYL HYDROCARBONS

Original Filed Nov. 11, 1930 2 Sheets-Sheet 1

INVENTOR

J. N. Carothers

BY

Johnston & Jennings

ATTORNEYS

PROCESS FOR PRODUCING DIARYL HYDROCARBONS

Original Filed Nov. 11, 1930 2 Sheets-Sheet 2

INVENTOR

J. N. Carothers

BY

Johnston & Jennings

ATTORNEYS

Reissued May 18, 1937

Re. 20,368

UNITED STATES PATENT OFFICE 20,368

PROCESS FOR PRODUCING DIARYL HYDROCARBONS

John N. Carothers, Anniston, Ala., assignor, by mesne assignments, to Monsanto Chemical Company, St. Louis, Mo., a corporation of Delaware Original No. 1,907,498, dated May 9, 1933, Serial No. 494,955, November 11, 1930. Application for reissue January 18, 1936, Serial No. 59,696

8 Claims. (Cl. 260—168)

Figure 1:
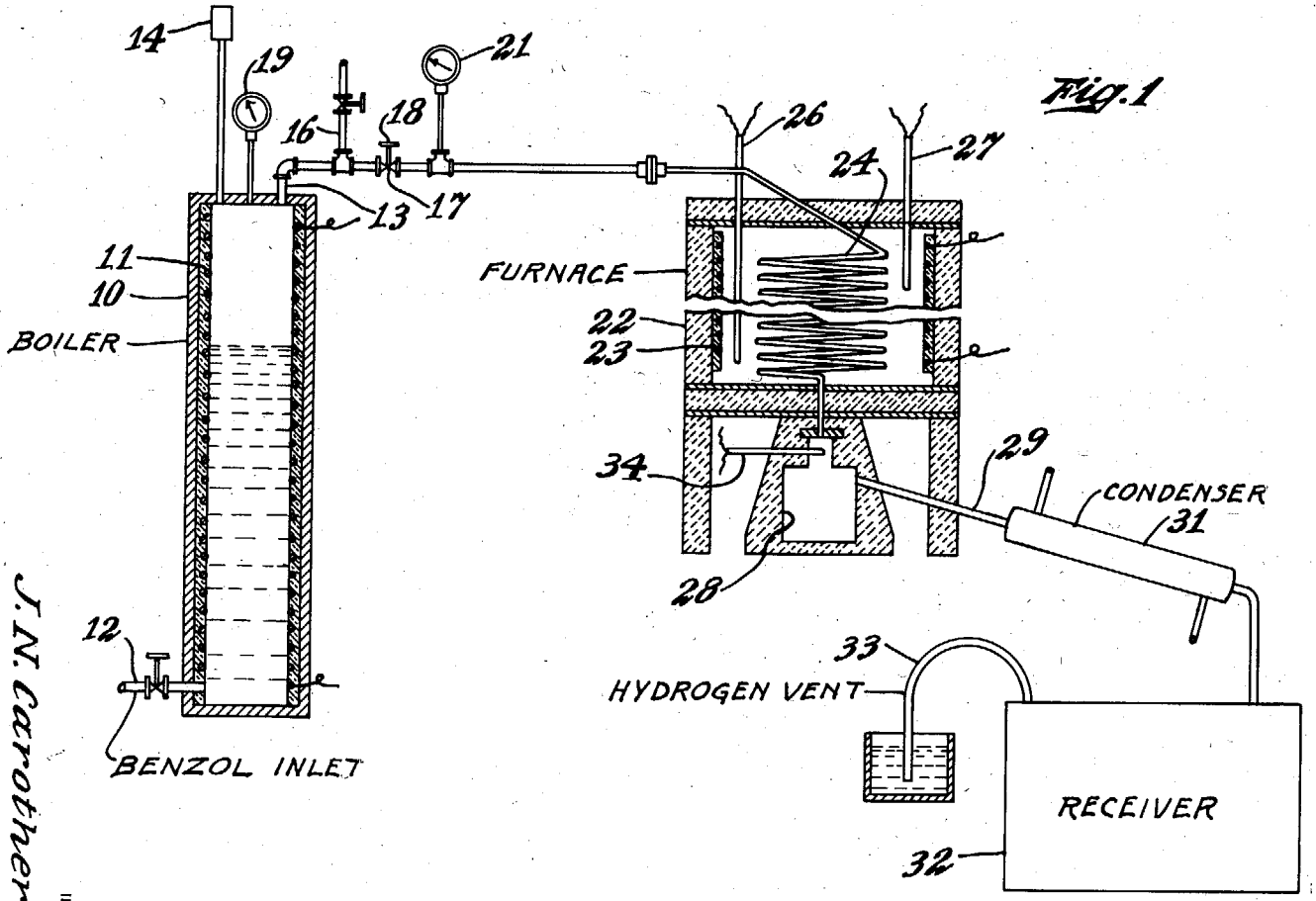

This invention relates to a process and apparatus for the production of diphenyl or other diaryls, particularly to a process in which the vapors of benzol or other aromatic hydrocarbon are heated in a tube to a temperature at which the molecular structure thereof is broken down and diphenyl or other diaryl formed; and has for its object the provision of conditions and means whereby formation of carbon is greatly decreased and larger yields of the desired diaryl obtained.

A further specific object of my invention is to provide a process for the production of diphenyl by thermal synthesis, wherein diphenyl may be readily obtained for commercial purposes.

Previous methods for producing diphenyl have been described by M. Berthelot in Ann. 142 251 (1867), Schultz, Ann. 174 201 (1874), Berthelot, Bull. Soc. Chem. (2) 22 437 (1874), Luddens Ber. 8 870 (1875), Schmidt and Schultz Ann. 203 118 (1880), Hubner Ann. 209 339 (1881), La Coste and Sorger Ann. 230 1 (1885), and McKee, J. Chem. Soc. April 30, 1904, page 403. In the methods described by these investigators it has been the practice to boil benzene under practically atmospheric pressure (Berthelot, La Coste) in a flask connected with the decomposition tube or to drop the liquid benzol directly into the tube (Schultz; also Schmidt and Schultz) or into a heated glass flask (McKee). Luddens and Hubner recognized the desirability of obtaining a uniform stream of benzol vapor and employed a stream of $CO_2$ to carry the benzol vapor through the tube.

In most of the work described by the hereinbefore mentioned investigators, in attempting the production of diphenyl by passing benzol vapors through an exteriorly heated tube, considerable difficulty was experienced due to the total decomposition of a large part of the benzol employed, into carbon and hydrogen or bituminous bodies which tended to stop up the tube and prevent the passage of the gases, making it necessary to interrupt the experiment until these bodies were removed. This is believed to partly account for the relatively small yields obtained, and also accounts for the fact that these described processes remained mere laboratory methods.

In my application, Serial Number 268,096, filed April 7th, 1928, there is shown, described and claimed a process for producing diphenyl by passing a stream of benzol vapor over electrically heated screens. In carrying out the invention aforesaid, I found that it was highly important that the benzol vapors be passed over the screens, heated to diphenyl forming temperatures, at a relatively high velocity, and the heated vapors cooled immediately they have attained rapid diphenyl forming temperatures, in order to prevent the total decomposition of a part of the benzol into carbon and hydrogen or bituminous bodies.

While the process described in my prior application has proved to be successful, I have found that satisfactory operation may be obtained by the simpler process herein described. In accordance with my present invention, I pass benzol vapors through an exteriorly heated tube and have devised such a process and apparatus whereby greater yields than any heretofore reported have been obtained and have overcome the necessity for frequent shut downs of the apparatus due to carbon and tar formation.

In carrying out my process, I have discovered that in order to reduce carbon formation to a minimum it is necessary to maintain the velocity of the gases above the critical value in passing through the tube, and preferably at a uniform rate. I have furthermore discovered that this critical velocity of the gases should preferably be maintained throughout the length of the tube, at least throughout that section of the tube within which the benzol vapors are heated above the temperature at which rapid diphenyl formation begins. Obstructions in the tube through which the gases are flowing are highly undesirable, since they are responsible for the formation of local areas in which the velocity of the gases drops below the critical velocity and hence, permits carbon formation.

I further discovered that the manner in which the benzol vapor is admitted to the heated section of the tube has a direct bearing on the rate of carbon formation, and that when the vapor stream fluctuates in velocity, as when benzol is vaporized by dropping it directly into a heated tube or into a heated flask connected therewith, or even when freely boiling it in a flask substantially under atmospheric pressure, marked fluctuations in the gas stream occur which are conducive to carbon formation. As a practical means of overcoming the latter objection, I have found that by introducing a restricted orifice, as by means of a throttling valve in the vapor conduit, between the benzol vaporizer and the heated tube, and thereby vaporizing benzol under pressures somewhat above atmospheric, it is possible to obtain a uniform vapor velocity through the heated section of the tube. Other means for obtaining uniform gas flow will occur to those skilled in the art.

As will be pointed out hereinafter, the process may be carried out with the formation of little or no carbon and satisfactory yields obtained while employing a ⅛" diameter pipe and velocities above 29 ft. per second. A marked decrease in the amount of carbon deposited may also be obtained by employing a strictly uniform flow of benzol vapor such as may be obtained by partly throttling the stream or by passing it through a suitable orifice.

Figure 2:
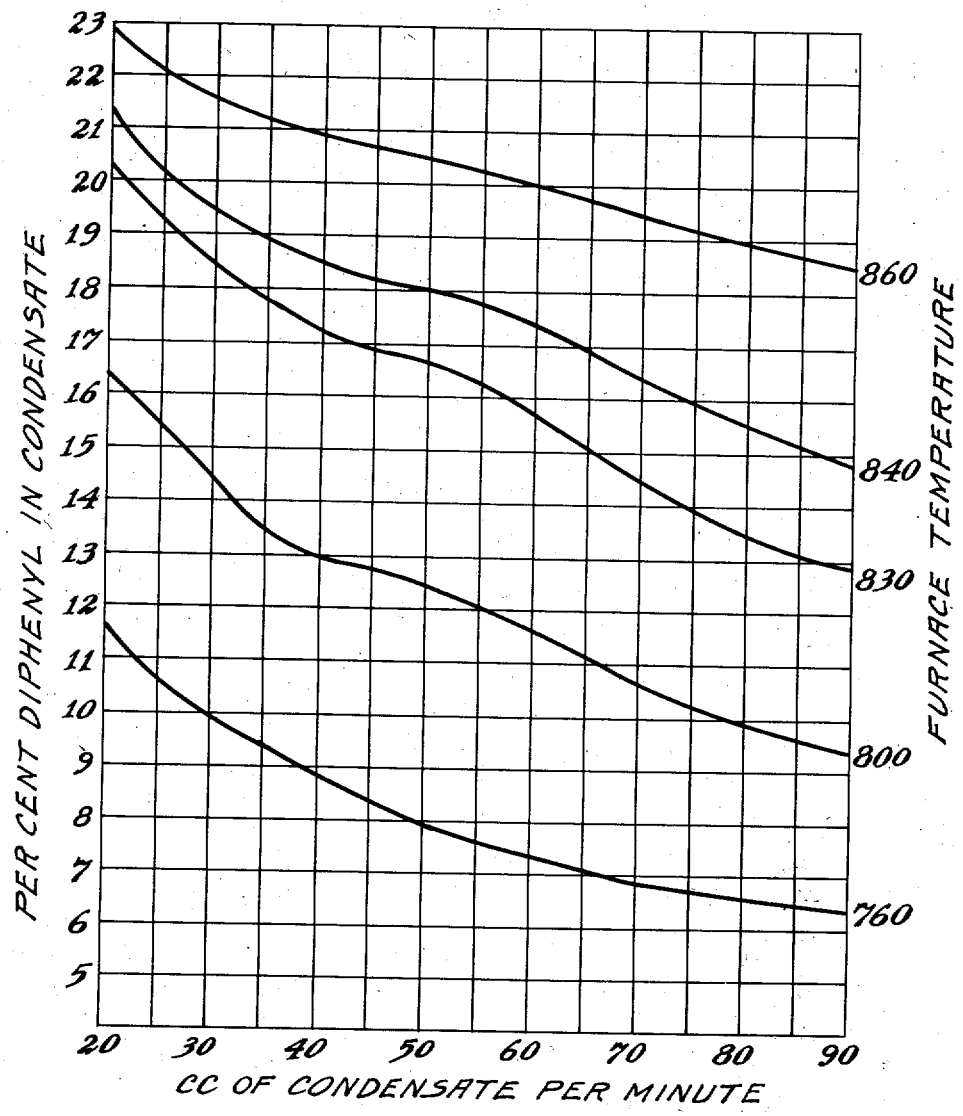

The accompanying drawings, forming a part of this application, illustrate an embodiment of my invention, in which:

Fig. 1 is a diagrammatic view of an apparatus suitable for carrying out the process; and Fig. 2 is a graphical representation showing the influence of temperature and rate of treatment of the benzol vapors.

Referring to the drawings, I show in Fig. 1 a boiler 10 for vaporizing the benzol. The boiler is provided with an electric heating coil 11, though any other suitable heating means may be employed. At 12 is an inlet for benzol to be vaporized and at 13 is a conduit through which the vaporized benzol is discharged. The boiler 10 is preferably provided with a safety valve 14. At 16 is shown a conduit which connects to the conduit 13, and through which a non-combustible gas, such as carbon dioxide is passed to purge the apparatus of air before starting the process.

The conduit 13 is provided with a restricted orifice at 17, the area of which may be varied by means of a valve 18. A gauge 19 shows the pressure in the boiler 10, while a gauge 21 shows the pressure immediately beyond the valve 18.

At 22 I show a furnace provided with a suitable heating means, such as an electric heating element 23, and in which is disposed a coiled tube 24. The tube 24 is connected to the conduit 13 so that vapors from the boiler 10 pass through the tube in the furnace 22, in which they are raised to diphenyl forming temperature. Suitable temperature recording devices 26 and 27 are disposed within the furnace whereby the temperature of the furnace may be observed.

At the bottom of the tube 24 is preferably disposed a carbon trap 28 and connected to the carbon trap is a conduit 29 leading to a condenser 31 from which the condensed vapors pass to a receiver 32. The receiver 32 is provided with a hydrogen vent 33. It is preferable also to provide a temperature indicator means 34 at the point of discharge of vapors from the coil 24 into the carbon trap 28.

In operation, I vaporize preferably dry, liquid benzol in the boiler 10 until a pressure of between 6 and 10 pounds above atmospheric is registered by the gauge 19. The apparatus being purged of air by passage of $CO_2$ therethrough, the furnace is heated to a temperature of from 750° to 900° C. and the valve 18 is opened to permit the passage of vapors through the tube 24. The drop in pressure through the restricted orifice formed by the valve 18 should be around 4 pounds to the square inch and can be noted by the gauge 21. The vapors then flow through the tube 24, being heated to diphenyl forming temperature, and from thence through the condenser 31 to the receiver 32, which is at substantially atmospheric pressure. The cross sectional area of the tube 24 is such that the vapors in passing therethrough flow at a turbulent rate, sufficiently above the critical velocity as determined for the particular size pipe employed, to prevent the formation of carbon. In apparatus such as I have illustrated, I have employed a pipe of ⅛" inside diameter 36 feet long, with good results. In place of a throttle valve such as 18, I have found that a fixed orifice may be used equally as well, or a simple constriction in the conduit will also serve the purpose.

A relation exists between the maximum temperature to which the tube 24 is heated and the velocity of the vapors within the tube so that the higher the temperature of tube 24, the higher must the velocity of the vapors be. I have operated successfully with tubes of ⅛" diameter steel tubing heated to 800° C. when the vapor velocity was as low as 29 feet per second and lower, without forming a troublesome amount of carbon. By operating in this manner with a tube 36 feet long, one obtains approximately 7.45% diphenyl in the condensate.

By increasing the furnace temperature to 860° C. and employing a heated tube 100 feet long, with a vapor velocity of 91 feet per second through the tube, I have obtained a yield of over 20% diphenyl, without any evidence of carbon in the trap 28 or in the condensate. I have found it preferable to employ a relatively long tube in order to maintain a sufficiently high velocity to avoid the formation of carbon, coupled with a sufficiently long period of contact of the vapors with the heated tube to insure their thorough heating to diphenyl forming temperatures. In the example just given the period of contact of the vapors in the heated tube was 1.10 seconds. The longer contact period provided by a tube 100 feet long as compared with a tube 36 feet long also permits the furnace to be operated at correspondingly lower temperatures for the same heating of the vapors, thereby avoiding damage to the tube or tubes due to excessively high temperatures.

As soon as the vapors are thus heated to diphenyl forming temperatures, they pass out of the heated portion of the tube 24, as seen in Fig. 1, and while still at a high velocity, through the carbon trap 28, into the condenser 31. They are thus cooled to a temperature below diphenyl forming temperature as soon as they reach a temperature within the optimum diphenyl forming range, which exact temperature is of course dependent on the temperature of the tube 24, and the period of contact of the vapor in the tube.

In Fig. 2 of the drawings I have summarized in graphical form an extended operation of a tube converter employing a heated tube ⅛" inside diameter 100 feet long. Inasmuch as the velocity of vapor through a tube with a given amount of vaporized benzol, varies with its temperature, I have indicated the amount of condensate per minute passing through the tube rather than the velocity in feet per second. All of the rates indicated are such as to effect a flow of vapor through the tube at a velocity substantially in excess of the critical and such as to prevent the deposition of carbon. For example the vapor velocity, with 65 c. c. condensate per minute, at 800° C. furnace temperature, was found to be 82 feet per second; at 840° C., 86 feet per second; and, at 860° C., 89 feet per second.

From Fig. 2, it will be observed that, with a vapor velocity sufficiently high to prevent the formation of carbon, the higher yields at a given temperature are obtained at the relatively lower velocities. This is for the reason that a longer contact period is obtained and the vapors are more thoroughly heated to diphenyl forming temperatures.

In this specification the term "critical velocity", is used in its common engineering sense, as indicating the velocity at which stream line flow changes to turbulent flow. As may be seen from the foregoing, the rate of flow of the vapors through a heated pipe, in order to prevent carbon formation, should be turbulent and considerably above the critical velocity.

Other diaryls such as ditolyls, dixylyls or dinaphthyls may also be made in accordance with my improved process. I do not wish therefore to be limited merely to the production of diphenyl. These compounds are formed by the pyrolytic decomposition of the corresponding hydrocarbon in an analogous manner to the formation of diphenyl. I have also determined that it is desirable to employ dry hydrocarbons for this purpose since the presence of moisture causes carbon formation during pyrolysis.

While I have described my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In a process of producing diphenyl in which benzol vapors are heated to diphenyl forming temperature by passing them through a heated tube and then cooled, the improvement which comprises passing the vapors through said heated tube at a linear velocity substantially above the calculated critical velocity, and limiting the period of contact of the vapors with the portion of the tube to diphenyl forming temperature heated to a maximum of 1.24 seconds.

2. In a process of producing diphenyl in which benzol vapors are heated to diphenyl forming temperature by passing them through a tube heated to a temperature between 750° and 900° C. and then cooled, the improvement which comprises passing the vapors through said tube at a turbulent rate of flow above the calculated critical linear velocity and such that the vapors flowing through the tube are in contact with the heated walls thereof no longer than 1.24 seconds, and then cooling the vapors.

3. In a process of producing diphenyl in which benzol vapors are heated to diphenyl forming temperature by passing them through a tube heated to a temperature between 750° and 900° C., and then cooled, the improvement which comprises providing a tube free of any vapor flow obstructions that would produce localized eddies therein and passing the vapors through said tube at a turbulent rate of flow above the calculated critical velocity and such that the vapors flowing through the tube are in contact with the heated walls thereof no longer than 1.24 seconds, and then cooling the vapors.

4. In a process of making diphenyl in which benzol vapors are heated to diphenyl forming temperature by passing them through an unobstructed tube heated to a temperature within the optimum diphenyl forming range, and then are cooled, the improvement which comprises vaporizing benzol under pressure above atmospheric, and then throttling the benzol vapors and passing them through said heated tube, the pressure drop through said tube being such that the linear velocity of the vapors is substantially above the calculated critical velocity, limiting the period of contact with the heated portion of the tube to a period of not more than 1.24 seconds, and then cooling the vapors.

5. In a process of making diphenyl in which benzol vapors are passed through a tube heated to diphenyl forming temperature and then cooled, the improvement which comprises passing the vapors at a linear velocity substantially above the calculated critical velocity through a tube heated to such a temperature that the benzol vapors in contact therewith are heated to a point where a conversion to diphenyl up to 20% is obtained when the vapors have been in contact with the tube so heated not more than 1.24 seconds, and then cooling the vapors immediately after they leave the heated tube.

6. The process of producing diphenyl which comprises heating benzol vapors to diphenyl forming temperatures by passing them through a tube heated to diphenyl forming temperature at a linear velocity above the calculated critical velocity, said tube being heated to such temperature as to effect a conversion of from 7.45% to 20% of the benzol passing through the tube to diphenyl, with a period of contact of said vapors with the tube so heated of not more than 1.24 seconds, and cooling the vapors as soon as they leave the heated portion of said tube.

7. The process of producing diphenyl which comprises heating benzol vapors to diphenyl forming temperatures by passing them through a tube heated to diphenyl forming temperature at a linear velocity above the calculated critical velocity, said tube being heated to such temperature as to effect a conversion of the benzol to diphenyl up to 20% with a period of contact of the vapors with the tube not exceeding 1.24 seconds, and cooling the vapors as soon as they are so heated.

8. The process of producing diphenyl which comprises heating benzol vapors to diphenyl forming temperatures by passing them through a tube heated to diphenyl forming temperature at a linear velocity substantially above the calculated critical velocity, said tube being heated to such temperature as to effect a conversion of from 7.45% to 20% of the benzol passing through the tube to diphenyl, with a period of contact of said vapors with the tube so heated of not more than 1.24 seconds, and cooling the vapors as soon as they are so heated.

JOHN N. CAROTHERS.